US012612733B2

(12) United States Patent
Steiner et al.

(10) Patent No.: US 12,612,733 B2
(45) Date of Patent: Apr. 28, 2026

(54) COATED ARTICLES AND THEIR METHOD OF MANUFACTURING AND USE

(71) Applicant: Surfactor Germany GmbH, Essen (DE)

(72) Inventors: Matthias Steiner, Vahlberg OT Berklingen (DE); Daria Struve, Braunschweig (DE)

(73) Assignee: Surfactor Germany GMBH, Essen (DE)

( * ) Notice: Subject to any disclaimer, the term of this patent is extended or adjusted under 35 U.S.C. 154(b) by 1001 days.

(21) Appl. No.: 17/269,650

(22) PCT Filed: Aug. 27, 2019

(86) PCT No.: PCT/EP2019/072892
§ 371 (c)(1),
(2) Date: Feb. 19, 2021

(87) PCT Pub. No.: WO2020/043745
PCT Pub. Date: Mar. 5, 2020

(65) Prior Publication Data
US 2022/0356651 A1 Nov. 10, 2022

(30) Foreign Application Priority Data
Aug. 27, 2018 (EP) .................................... 18191030

(51) Int. Cl.
*C09D 161/28* (2006.01)
*B27N 3/00* (2006.01)
*B27N 7/00* (2006.01)
*D21H 19/26* (2006.01)

(52) U.S. Cl.
CPC ............. *D21H 19/26* (2013.01); *B27N 3/002* (2013.01); *B27N 7/005* (2013.01)

(58) Field of Classification Search
CPC ....... D21H 19/26; B27N 3/002; D06M 15/41; C09D 161/28; C09D 161/34
See application file for complete search history.

(56) References Cited

U.S. PATENT DOCUMENTS 4,978,711 A * 12/1990 Schmidt-Hellerau ........................ C08L 61/34 524/541
5,288,523 A 2/1994 Klaiber et al.
6,399,719 B1 6/2002 Dopico et al.
8,088,881 B2 1/2012 No et al.
9,695,319 B2 7/2017 Breyer et al.
10,005,314 B2 6/2018 Szejwian
2005/0084682 A1 4/2005 Gfeller et al.
2005/0136276 A1* 6/2005 Borup ..................... B32B 21/14 162/158
2011/0159208 A1 6/2011 Price
2017/0120473 A1* 5/2017 Zhang .................... C09D 5/185

FOREIGN PATENT DOCUMENTS

CL 199501900 10/1996
CL 44570 B1 4/2001
CL 200901465 10/2009
CL 56795 B1 10/2015
CL 201502638 7/2016
CL 58626 B1 11/2017
CN 104395398 A 3/2015
DE 23 52 243 A1 4/1975
EP 0 277 106 A1 8/1988
EP 2 749 413 B1 5/2016
EP 3 118 373 A1 1/2017
WO 2017/111689 A1 6/2017

OTHER PUBLICATIONS

International Search Report of PCT/EP2019/072892, dated Nov. 7, 2019 [PCT/ISA/210].
Written Opinion of PCT/EP2019/072892, dated Nov. 7, 2019 [PCT/ISA/237].
Search Report dated Aug. 22, 2022 issued by the Chilean Patent Office in Chilean Application No. 202100453.
Office Action dated Aug. 22, 2022 issued by the Chilean Patent Office in Chilean Application No. 202100453.
Gerhard W. Becker et al., “Kunststoff Handbuch”, Duroplaste, 1988, vol. 10, pp. 47 (4 pages total).
Dr. Arno Gardziella et al., “Duroplastiche Harze, Formmassen und Werkstoffe”, Chemia, Eigenschaften, wirtschaftliche Bedeutung, aktuelle Anwendungen und Technologien, 2000, pp. 34-39 (6 pages total).
English Abstract of Chilean Application No. 200001392 published on Apr. 18, 2001, corresponds to U.S. Pat. No. 6,399,719.
English Abstract of Chilean Application No. 200901465 published Oct. 23, 2009, corresponds to U.S. Pat. No. 8,088,881.
English Abstract of Chilean Application No. 201501822 published Oct. 2, 2015, corresponds to European Patent No. 2 749 413.
English Abstract of Chilean Application No. 201502638 published Jul. 22, 2016, corresponds to U.S. Pat. No. 9,695,319.
English Abstract of Chilean Application No. 201700910 published Nov. 3, 2017, corresponds to U.S. Pat. No. 10,005,314.

* cited by examiner

*Primary Examiner* — Hai Y Zhang
(74) *Attorney, Agent, or Firm* — Sughrue Mion, PLLC

(57) ABSTRACT

The present invention relates to a coated article, comprising a carrier material and a resin composition, preferably a B-stage resin composition. The invention further relates to the method of preparing said coated article and in particular to the use of said coated articles for the manufacture of shuttering boards.

9 Claims, No Drawings

COATED ARTICLES AND THEIR METHOD OF MANUFACTURING AND USE

The present invention relates to a coated article, comprising a carrier material and a resin composition comprising melamine, urea, phenol and formaldehyde. In another aspect, the present invention relates to a coated article, comprising a carrier material and a B-staged resin composition comprising melamine, urea, phenol and formaldehyde. The invention further relates to the method of preparing said coated article and in particular to the use of these coated articles for preparing shuttering boards for building purposes, in particular concrete shuttering boards.

Shuttering boards for concrete shuttering should meet certain requirements, especially if the resulting concrete surface should have a smooth surface after the shuttering. In this case the shuttering boards should also have a coating with a smooth surface. Furthermore, it would be advantageous if the shuttering board coating had good water resisting properties. Since these products are in general cost intensive, the board should be reusable.

Phenol-formaldehyde resins (PF)-resins are synthetic polymers obtained by the reaction of phenol or substituted phenol with formaldehyde. Phenolic resins are known for the preparation of shuttering boards for concrete shuttering, since it gives smooth concrete surfaces due to their good surface properties. This can be combined with a low tendency of brittleness.

EP 2 749 385 A1 describes a reusable plywood for a concrete mould, which is impregnated with a phenolic resin.

However, due to the toxic properties of phenols, there is a continuous need for coated articles for the production of shuttering boards whose preparation is more environmental and user friendly.

In the past, reductions in free phenol levels have been most easily achieved by increasing the formaldehyde to phenol molar ratio in the phenolic resins. However, this usually tends to increase the level of free formaldehyde in the resin and thus increases the amount of formaldehyde released during processing and curing. Due to the cancerogenic potential of formaldehyde this approach is disadvantageous.

For a reduction of free phenol WO 2008/141042 A1 teaches the preparation of a conventional phenolic resin in the first step followed by removal of the residual phenol (e.g. by heating under vacuum, azeotropic distillation or film evaporation) and subsequent addition of an organic solvent or a dibasic ester. As a result, also this production process is based on a phenol-enriched resin and requires further technically complex and costly process steps.

In WO 2015/117758 A1 a phenolic resin comprising vinasse is disclosed, which results in a reduced proportion of aromatic hydroxylic compounds in the resin. But in this resin composition phenol is still one of the main components.

Hence, there is a need for a coated article, in particular for the production of shuttering boards, which overcomes at least one of the above-mentioned disadvantages.

This problem is solved by providing a coated article comprising a carrier material, which is preferably paper, and a resin composition comprising either a melamine-urea-phenol-formaldehyde-co-condensate, or a mixture of a melamine-formaldehyde (MF)-resin, a urea-formaldehyde (UF)-resin and a phenol-formaldehyde (PF)-resin or a mixture of both, the co-condensate and the mixture. In one embodiment, the resin composition has

- a molar ratio of phenol to total formaldehyde in the range of at least 1 to 5, preferably of at least 1 to 8, more preferably of at least 1 to 10, most preferably of at least 1 to 13,
- a molar ratio of melamine to total formaldehyde in the range of at least 1 to 1, preferably of at least 1 to 2, most preferably of at least 1 to 3 and
- a molar ratio of urea to total formaldehyde in the range of at least 1 to 1, preferably of at least 1 to 2, more preferably of at least 1 to 3, most preferably of at least 1 to 4.

In a preferred embodiment the resin composition is a B-stage resin composition. A "coated" article means every article on which a resin composition according to the invention is at least partially applied.

If not stated explicitly otherwise said melamine-urea-phenol-formaldehyde-co-condensate and the mixture of a melamine-formaldehyde (MF)-resin, a urea-formaldehyde (UF)-resin and a phenol-formaldehyde (PF)-resin as well as a mixture thereof, will be referred to commonly as a "(MUPF)-resin".

The term "B-stage" refers to the degree of crosslinking. When referring to a B-stage resin it is meant that the polymer chains in the composition are only partially crosslinked, namely the degree of crosslinking is below 100% (see A. Brent Strong, Fundamentals of composites Manufacturing 2nd Ed., Society of Manufacturing Engineers, 2008, p. 124). In a preferred embodiment the B-stage resin composition has a degree of crosslinking of less than 95%, more preferably of less than 90%, even more preferred of less than 80%.

"Crosslinking" is understood in the context of the invention as a chemical bond that connects polymer chains, preferably by forming covalent bonds. The bonds can be formed by various types of reactions known in the art, particularly they can be formed by condensation reactions. The crosslinking of polymer chains can be initiated by chemical additives, ultraviolet radiation, electron beam or heat. The term crosslinking and "curing" can be used interchangeably.

In the context of the present invention the term "condensation" or "condensation reactions" refers to the polymerization of the monomers or the formation of a polymer chain, together with the formation of at least one by-product, such as water, ammonia, alcohols or hydrogen chloride.

A "carrier material" as used in the present invention is any material than can be coated with the resin composition. The carrier material may generally be selected from the group consisting of paper, in particular kraft paper or sack paper, card board, glass fibre, textiles including woven and non-woven fabrics, plastics including rigid foam and foam plastic, mineral material such as ceramics or cellular concrete, metal such as metal foils.

As used herein the term "paper" is defined as a layered material mainly constituted of fibres, which can be natural or synthetic, preferably derived from plants, in particular wood or grasses, or textiles. The paper preferably is kraft paper.

In a preferred embodiment of the invention the carrier material is having a weight per square meter of 20 to 100 gsm, preferably 30 to 90 gsm, most preferably 40 to 80 gsm. Preferably this carrier is a kraft paper.

The overall weight of the coated article of the invention can be in the range of 80 to 300 g/m$^2$, preferably of 100 to 270 g/m$^2$, more preferably of 115 to 240 g/m$^2$. Most preferably the coated article has an overall weight between 120 to 220 g/m$^2$.

The resin composition comprised in the coated article according to the invention, alternatively, can be defined as a resin composition, which is flowable. A resin composition is defined as "flowable" if the article coated therewith shows a flow in particular at elevated temperatures and under given predetermined pressure. The amount of resin leaking out from the coated article due to this treatment reflects the "flow". Preferred resin compositions according to the invention show a weight loss of at least 1%, more preferably of at least 2%, of at least 3% or, most preferably of at least 5% when being pressed for 2 min at 160° C. under 2.0 N/mm$^2$. The flow can be quantified in a flow test as described in example 4 below.

Thus, the invention also pertains to a coated article comprising a carrier material, preferably paper, and a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof, wherein the resin composition can be characterized by its flow. In a preferred embodiment the resin composition has a flow of at least 1%, preferably of at least 2%, of at least 3% or, most preferably of at least 5% when the article is subjected for 2 min to a pressure of 160° C. and 2.0 N/mm$^2$.

In yet another approach the resin composition comprised in the coated article according to the invention can be defined as a resin composition comprising at least 3% by weight of residual volatiles.

The skilled person is aware of and able to select suitable methods and standard tests for determining the content of residual volatiles such as solvents including organic solvents and water. For example, residual volatiles can be measured by keeping the coated article in a oven for 2 min at 160° C. and determining the amount of volatiles as reflected by the weight loss of the article due to this treatment. A test for the determination of residual volatiles is given in detail in example 3 below.

In a preferred embodiment of the invention the total content of residual volatiles in the resin composition is at least 5% by weight and, most preferably, at least 7% by weight.

Preferably the total content of residual volatiles in the coating article is lower than 20% by weight, more preferably lower than 15% by weight, most preferably lower than 10% by weight. In a most preferred embodiment the total content of residual volatiles is between 3% and 15% by weight, in particular between 3% and 10% by weight.

Thus, the invention also pertains to a coated article comprising a carrier material, preferably paper, and a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof, wherein the resin composition has a total content of residual volatiles of at least 2% by weight.

All further embodiments and advantages of the invention as described in detail below equally relate to any of these three alternatives alone or in combination. It is thus also possible, and even preferred, that the coated article of the invention is characterized by two or all three alternatives as outlined above.

The inventors found that the use of the (MUPF-)-resin as defined by the invention does not have a critical impact on the quality of the resulting coated articles and the shuttering boards produced therewith. Especially the coated article according to the invention does not show cracking (example 2), which would otherwise hinder its use for the manufacture of high quality reusable shuttering boards.

The shuttering boards manufactured with the coated articles of the invention, in general, show a similar—in some aspects even better—performance as shuttering boards coated with phenolic resin compositions. This was surprising since melamine formaldehyde or urea formaldehyde resin compositions or mixtures thereof were known for their enhanced brittleness and therefore higher tendency to crack (G. W. Becker, D. Braun, H. Gausepohl, R. Gellert, Kunststoff-Handbuch, Vol 10, p. 47).

In particular, the inventors found that the coated article of the invention has a low water permeability (as defined in the COBB values), which is even substantially lower than the water permeability of an article coated with a phenolic resin composition (example 2).

The water permeability can be measured by the absorbed water quantity through the surface (i.e. COBB values) of the coated articles. A lower COBB value is indicating a lower water take-up. A low water permeability of the shuttering boards comprising the coated article can be preferably suitable for concrete shuttering applications where a smooth concrete surface is favoured.

Therefore, in a preferred embodiment of the invention the coated articles exhibit a 7 day COBB value of 300 g/m$^2$ or less, preferably of 250 g/m$^2$ or less, more preferably of 200 g/m$^2$ or less.

Hence, in one particularly preferred aspect of the invention the coated articles are used for preparing shuttering boards, in particular shuttering boards for concrete shuttering. Due to the lower phenol content of the (MUPF)-resin composition compared to phenolic resin composition applied for this purpose in the prior art, this fosters environmental protection.

Furthermore, and surprisingly, the (MUPF)-resin composition as used according to the invention has a low free formaldehyde emission, which is even lower than the free formaldehyde emission of phenolic resin compositions (example 1). This even more promotes an environmentally-friendly production of wood boards and, in general, benefits health and safety concerns.

The invention relates to a coated article comprising a carrier material, preferably paper, and a resin composition comprising a melamine-urea-phenol-formaldehyde-co-condensate, or a mixture of a melamine-formaldehyde (MF)-resin, a urea-formaldehyde (UF)-resin and a phenol-formaldehyde (PF)-resin, or a mixture thereof. In one embodiment, the resin composition has

- a molar ratio of phenol to total formaldehyde in the range of at least 1 to 5, preferably of at least 1 to 8, more preferably of at least 1 to 10, most preferably of at least 1 to 13,
- a molar ratio of melamine to total formaldehyde in the range of at least 1 to 1, preferably of at least 1 to 2, most preferably of at least 1 to 3 and
- a molar ratio of urea to total formaldehyde in the range of at least 1 to 1, preferably of at least 1 to 2, more preferably of at least 1 to 3, most preferably of at least 1 to 4.

Preferably, the resin composition is in the B-stage. As outlined above this means that the resin composition is only partially cured. Alternatively, the resin composition can be characterized by having a flow of the resin composition of at least 1% and/or a residual volatile content of at least 3% by weight.

As outlined above, providing a coated material with the resin composition according to the invention allows for improved surface properties of the resulting coated article, which—in turn—leads to high quality wood boards, in particular shuttering boards, especially for use in concrete shuttering.

In a preferred embodiment the coated article according to the invention comprises at least 50% by weight of resin composition, preferably at least 55% by weight of resin composition, most preferably at least 60% by weight of resin composition based on the weight of the dried coated article.

The resin composition of the coated article is obtainable by providing a composition comprising at least the following components: melamine, urea, phenol and formaldehyde. These components condensate and—at least partially—crosslink to form the resin composition.

In one embodiment, a shuttering board is provided which is obtainable by applying a coated article comprising a carrier material, preferably paper, and a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, to a wood board.

In another embodiment a shuttering board is provided which comprises wood, preferably spruce, birch and/or meranti wood and coated carrier material, preferably paper comprising at least one resin composition containing phenol, melamine, urea, formaldehyde and optionally additives.

In another embodiment a shuttering board is provided which comprises wood, preferably spruce, birch and/or meranti wood and coated carrier material, preferably paper comprising at least two differing resin compositions each containing phenol, melamine, urea, formaldehyde and optionally additives.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition is a B-stage resin composition.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of phenol to total formaldehyde preferably is in the range of at least 1 to 5, preferably of at least 1 to 8, more preferably of at least 1 to 10, most preferably of at least 1 to 13.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of phenol to total formaldehyde preferably is in the range of at least 1 to 5, preferably of at least 1 to 8, more preferably of at least 1 to 10, most preferably of at least 1 to 13 and up to a maximum molar ratio of phenol to total formaldehyde of 1 to 30, more preferably up to a maximum of 1 to 25, most preferably up to a maximum of 1 to 20, very most preferably up to a maximum of 1 to 15.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of phenol to total formaldehyde is in the range from 1:10 to 1:15.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of melamine to total formaldehyde can preferably be in the range of at least 1 to 1, preferably of at least 1 to 2, most preferably of at least 1 to 3.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of melamine to total formaldehyde preferably is in the range of at least 1 to 1, preferably of at least 1 to 2, more preferably of at least 1 to 3, most preferably of at least 1 to 4 and up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of melamine to total formaldehyde is in the range from 1:4 to 1:8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of urea to total formaldehyde in the range of at least 1 to 1, preferably of at least 1 to 2, more preferably of at least 1 to 3, most preferably of at least 1 to 4.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of urea to total formaldehyde preferably is in the range of at least 1 to 1, preferably of at least 1 to 2, more preferably of at least 1 to 3, most preferably of at least 1 to 4 and up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has a molar ratio of urea to total formaldehyde is in the range from 1:3 to 1:8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is in the range of at least 1 to 5, preferably of at least 1 to 8, more preferably of at least 1 to 10, most preferably of at least 1 to 13 and melamine to total formaldehyde preferably is in the range of at least 1 to 1, preferably of at least 1 to 2, most preferably of at least 1 to 3.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15 and melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde in the range from 1:10 up to 1:15, melamine to total formaldehyde in the range from 1:4 up to 1:8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is in the range of at least 1 to 5, preferably of at least 1 to 8, more preferably of at least 1 to 10, most preferably of at least 1 to 13 and urea to total formaldehyde preferably is in the range of at least 1 to 1, preferably of at least 1 to 2, more preferably of at least 1 to 3, most preferably of at least 1 to 4.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15 and urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde in the range from 1:10 up to 1:15 and urea to total formaldehyde in the range from 1:3 up to 1:8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

melamine to total formaldehyde preferably is in the range of at least 1 to 1, preferably of at least 1 to 2, most preferably of at least 1 to 3 and urea to total formaldehyde preferably is in the range of at least 1 to 1, preferably of at least 1 to 2, more preferably of at least 1 to 3, most preferably of at least 1 to 4.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8 and urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

melamine to total formaldehyde in the range from 1:4 up to 1:8 and urea to total formaldehyde in the range from 1:3 up to 1:8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is in the range of at least 1 to 5, preferably of at least 1 to 8, more preferably of at least 1 to 10, most preferably of at least 1 to 13, melamine to total formaldehyde preferably is in the range of at least 1 to 1, preferably of at least 1 to 2, most preferably of at least 1 to 3 and urea to total formaldehyde preferably is in the range of at least 1 to 1, preferably of at least 1 to 2, more preferably of at least 1 to 3, most preferably of at least 1 to 4.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15, melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8 and urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In another embodiment, a shuttering board is provided which comprises wood, preferably spruce, birch and/or meranti wood and coated carrier material, preferably paper comprising at least one resin composition containing phenol, melamine, urea, formaldehyde and optionally additives, wherein the resin composition has the following molar ratios:

phenol to total formaldehyde in the range from 1:10 up to 1:15, melamine to total formaldehyde in the range from 1:4 up to 1:8 and urea to total formaldehyde in the range from 1:3 up to 1:8.

The term "melamine" as used in the context of the present invention is defined as a class of compounds consisting of melamine and optionally substituted melamine. Melamine is (2,4,6-triamino-1,3,5-triazine) is a heterocyclic aromatic compound having the formula ($C_3$H6N6). "Optionally substituted melamine" means substituted, partially substituted or unsubstituted melamine. Examples for substituted and partially substituted melamine are 2,4,6-trialkylamino-1,3,5-triazine, 2,4,6-trialkenylamino-1,3,5-triazine, 2,4,6-triarylamino-1,3,5-triazine 2,4-dialkylamino-6-amino-1,3,5-triazine or 2,4-diamino-6-alkenylamino-1,3,5-triazine.

The term "phenol" as used in the present invention is defined as a class of compounds consisting of phenol and optionally substituted phenol. Phenol is an aromatic organic compound with the molecular formula $C_6H_5OH$ and comprises at least one hydroxyl group (—OH) bonded directly to an aromatic hydrocarbon group. "Optionally substituted phenol" means substituted, partially substituted or unsubstituted phenol. Suitable substituted or partially substituted phenols are for example alkylphenol, alkenylphenol, arylphenol or heteroarylphenol.

"Urea" is defined as a class of compounds consisting of urea having the chemical formula $CO(NH_2)_2$ and optionally substituted urea. "Optionally substituted urea" means substituted, partially substituted or unsubstituted amino groups in the urea. The urea can be substituted with alkyl, alkenyl, aryl or heteroaryl groups.

"Alkyl" means C1 to C10 straight or branched chain alkyl, for example, methyl, ethyl, n-propyl, isopropyl, n-butyl, isobutyl, sec-butyl, tert-butyl, n-pentyl, isopentyl, neopentyl, tert-pentyl, n-hexyl, isohexyl, n-heptyl, n-octyl, n-nonyl, n-decyl. Preferred is C1 to C6 alkyl, for example, methyl, ethyl, n-propyl, isopropyl, n-butyl, isobutyl, sec-butyl, tert-butyl, n-pentyl, isopentyl, neopentyl, tert-pentyl, n-hexyl, isohexyl.

"Alkenyl" means C2 to C8 straight or branched chain alkenyl derived from the above "alkyl" having one or more double bonds, for example, vinyl, 1-propenyl, 2-propenyl, 1-butenyl, 2-butenyl, 3-butenyl, 1,3-butadienyl, 3-methyl-2-butenyl. "Aryl" means monocyclic aromatic hydrocarbon group (e.g., phenyl) or polycyclic aromatic hydrocarbon group (e.g., 1-naphthyl, 2-naphthyl, 1-anthoryl, 2-anthoryl, 9-anthoryl, 1-phenantryl, 2-phenantryl, 3-phenantryl, 4-phenantryl, 9-phenantryl). Preferred is phenyl or naphthyl (e.g., 1-naphthyl, 2-naphthyl).

"Heteroaryl" means monocyclic aromatic heterocyclic group and condensed aromatic heterocyclic group.

The composition used for the coating of the carrier material favourably has the pH value, which is suitable for the condensation of the components. Hence the composition advantageously comprises a means for adjusting the pH, such as an alkali metal hydroxide, an earth alkali metal hydroxide, an amine or an inorganic or organic ammonium compound can be used. In a most preferred embodiment, NaOH or KOH is used for pH adjustment.

In an alternative embodiment the resin composition comprised in the coated article is obtainable by matching at least the following components melamine-formaldehyde (MF)-resin, urea-formaldehyde (UF)-resin and a phenol-formaldehyde (PF)-resin. These components are partially cured. Thus, these components are curable condensates.

"Melamine-formaldehyde" resin (short (MF)-resin) is a thermosetting (i.e. aminoplast). It is made from melamine and formaldehyde by condensation of the two monomers, with formaldehyde acting as a crosslinker. The melamine reacts with formaldehyde under alkaline conditions to form mixtures of various melamine-formaldehyde adducts also described as methylolmelamines.

"Urea-formaldehyde" resin (short (UF)-resin) is a semi-crystalline thermosetting. The urea-formaldehyde resin is made up of urea and formaldehyde with formaldehyde acting as a crosslinker.

A "thermosetting" (i.e. thermosetting plastic or thermosetting resin) is a polymer which becomes irreversibly hardened upon curing.

The composition providing the resin composition can further comprise modifiers such as e.g. acrylates, glycol, diamide, sulphonamide, thiourea, lactame, saccharide, guanamine, preferably caprolactame, acetoguanamine, benzoguanamine, dicyandiamide or p-toluene-sulphonamide or mixtures thereof. Acrylates are preferred. The modifier can react with the components of the composition (as defined above).

In the resin composition comprised in the coated article the molar ratio of phenol to total formaldehyde preferably is in the range of at least 1 to 5, preferably of at least 1 to 8, more preferably of at least 1 to 10, most preferably of at least 1 to 13.

In the resin composition comprised in the coated article a molar ratio of phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15.

In the resin composition comprised in the coated article a molar ratio of phenol to total formaldehyde preferably is in the range of at least 1 to 5, preferably of at least 1 to 8, more preferably of at least 1 to 10, most preferably of at least 1 to 13 and up to a maximum molar ratio of phenol to total formaldehyde of 1 to 30, more preferably up to a maximum of 1 to 25, most preferably up to a maximum of 1 to 20, very most preferably up to a maximum of 1 to 15.

In the resin composition comprised in the coated article the molar ratio of phenol to total formaldehyde is very most preferably in the range from 1:10 to 1:15.

In the resin composition comprised in the coated article the molar ratio of melamine to total formaldehyde can preferably be in the range of at least 1 to 1, preferably of at least 1 to 2, most preferably of at least 1 to 3.

In the resin composition comprised in the coated article a molar ratio of melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In the resin composition comprised in the coated article a molar ratio of melamine to total formaldehyde preferably is in the range of at least 1 to 1, preferably of at least 1 to 2, more preferably of at least 1 to 3, most preferably of at least 1 to 4 and up to a maximum molar ratio of melamine to total formaldehyde of 1 to 20, more preferably up to a maximum of 1 to 15, most preferably up to a maximum of 1 to 10, very most preferably up to a maximum of 1 to 8.

In the resin composition comprised in the coated article the molar ratio of melamine to total formaldehyde is very most preferably in the range from 1:4 to 1:8.

In a preferred embodiment of the invention the resin composition of the coated article has a molar ratio of urea to total formaldehyde in the range of at least 1 to 1, preferably of at least 1 to 2, more preferably of at least 1 to 3, most preferably of at least 1 to 4.

In the resin composition comprised in the coated article a molar ratio of urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In the resin composition comprised in the coated article a molar ratio of urea to total formaldehyde preferably is in the range of at least 1 to 1, preferably of at least 1 to 2, more preferably of at least 1 to 3, most preferably of at least 1 to 4 and up to a maximum molar ratio of melamine to total formaldehyde of 1 to 20, more preferably up to a maximum of 1 to 15, most preferably up to a maximum of 1 to 10, very most preferably up to a maximum of 1 to 8.

In the resin composition comprised in the coated article the molar ratio of urea to total formaldehyde is very most preferably in the range from 1:3 to 1:8.

In a most preferred embodiment of the invention the resin composition comprised in the coated article has the following molar ratios:

phenol to total formaldehyde preferably is in the range of at least 1 to 5, preferably of at least 1 to 8, more preferably of at least 1 to 10, most preferably of at least 1 to 13, melamine to total formaldehyde preferably is in the range of at least 1 to 1, preferably of at least 1 to 2, most preferably of at least 1 to 3 and urea to total formaldehyde preferably is in the range of at least 1 to 1, preferably of at least 1 to 2, more preferably of at least 1 to 3, most preferably of at least 1 to 4.

In a most preferred embodiment of the invention the resin composition comprised in the coated article has the following molar ratios: phenol to total formaldehyde of at least 1 to 13, melamine to total formaldehyde of at least 1 to 3 and urea to total formaldehyde of least 1 to 4.

In a most preferred embodiment of the invention the resin composition comprised in the coated article has the following molar ratios:

phenol to total formaldehyde preferably is up to a maximum molar ratio of phenol to total formaldehyde of 1 to 30, more preferably up to a maximum of 1 to 25, most preferably up to a maximum of 1 to 20, very most preferably up to a maximum of 1 to 15, melamine to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8 and urea to total formaldehyde preferably is up to a maximum molar ratio of melamine to total formaldehyde of 1 to 20, more preferably up to a maximum of 1 to 15, most preferably up to a maximum of 1 to 10, very most preferably up to a maximum of 1 to 8.

In a very most preferred embodiment of the invention the resin composition comprised in the coated article has the following molar ratios:

phenol to total formaldehyde in the range from 1:10 up to 1:15, melamine to total formaldehyde in the range from 1:4 up to 1:8 and urea to total formaldehyde in the range from 1:3 up to 1:8.

Thus, in a preferred embodiment of the invention a coated article is provided comprising a carrier material, preferably paper, and a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, wherein the resin composition has

- a molar ratio of phenol to total formaldehyde in the range of at least 1 to 5, preferably of at least 1 to 8, more preferably of at least 1 to 10, most preferably of at least 1 to 13,
- a molar ratio of melamine to total formaldehyde in the range of at least 1 to 1, preferably of at least 1 to 2, most preferably of at least 1 to 3 and
- a molar ratio of urea to total formaldehyde in the range of at least 1 to 1, preferably of at least 1 to 2, more preferably of at least 1 to 3, most preferably of at least 1 to 4.

In further preferred embodiment of the invention a coated article is provided comprising a carrier material, preferably paper, and a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, wherein the resin composition has

- a molar ratio of phenol to total formaldehyde up to a maximum molar ratio of phenol to total formaldehyde of 1 to 30, more preferably up to a maximum of 1 to 25, most preferably up to a maximum of 1 to 20, very most preferably up to a maximum of 1 to 15,
- a molar ratio of melamine to total formaldehyde up to a maximum molar ratio of melamine to total formaldehyde of 1 to 20, more preferably up to a maximum of 1 to 15, most preferably up to a maximum of 1 to 10, very most preferably up to a maximum of 1 to 8 and
- a molar ratio of urea to total formaldehyde up to a maximum molar ratio of melamine to total formaldehyde of 1 to 20, more preferably up to a maximum of 1 to 15, most preferably up to a maximum of 1 to 10, very most preferably up to a maximum of 1 to 8.

In more preferred embodiment of the invention a coated article is provided comprising a carrier material, preferably paper, and a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, wherein the resin composition has

- a molar ratio of phenol to total formaldehyde in the range from 1:10 up to 1:15,
- a molar ratio of melamine to total formaldehyde in the range from 1:4 up to 1:8 and
- a molar ratio of urea to total formaldehyde in the range from 1:3 up to 1:8.

In another aspect of the invention a shuttering board is provided which is obtainable by applying a coated article as defined above to a wood board.

Optionally the resin composition comprised in the coated article of the invention contains additives. Preferred additives are selected from a group consisting of inorganic or organic fillers, dyes, pigments, thickeners, lubricants, antifoamers, dispersing agents, levelling agents, photo-sensitizers, flame retardants, brighteners, polymerization inhibitors, release agents and thixotropic agents. These additives may be used alone or in combination as required.

Additives can further be selected from a group consisting of wax, oils, fats, fatty acids, alkanes, alkenes and their derivatives and mixtures thereof. Preferred additives are selected from the group consisting of silicone oils, paraffin, stearin, stearic acid, alkene ketene dimer (AKD), alkenyl succinic anhydride (ASA), tall oil fatty acid, bitumen, pitch and mixtures thereof.

In particular additives present in the first resin composition comprise paraffin, alkene ketene dimer (AKD), bitumen, pitch or mixtures thereof. Most preferred is AKD.

In one embodiment of the invention an alcohol is added to the resin composition in order to increase the shelf life of the resin composition and/or the coated article and/or to improve the penetration of the resin composition into the carrier material. As defined in the context of the present invention, the term "alcohol" includes aromatic and alkyl alcohols, mono-alcohols, diols, triols and polyols and also oligomeric or polymeric alcohols. In a preferred embodiment an alkyl alcohol is used such as methanol, ethanol or phenoxyethanol, preferably phenoxyethanol.

The coated article of the invention can be manufactured by a method comprising the following steps a) providing a carrier material,
b) applying a resin composition comprising a melamine-urea-phenol-formaldehyde-co-condensate, or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin to the carrier material.
c) optionally curing the resin composition.

Alternatively, the coated article of the invention can be manufactured by a method comprising the following steps a) providing a carrier material,
b) applying a resin composition comprising a melamine-urea-phenol-formaldehyde-co-condensate, or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin to the carrier material.
c) optionally curing the resin composition therewith resulting in a resin composition, wherein the degree of crosslinking is less than 100%, preferably less than 95%, more preferably less than 90%, most preferably less than 80%.

In a further embodiment of the invention the coated article of the invention can be manufactured by a method comprising the following steps a) providing a carrier material,
b) applying a resin composition comprising a melamine-urea-phenol-formaldehyde-co-condensate, or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin to the carrier material.
c) optionally curing the resin composition therewith resulting in a resin composition, wherein the total content of residual volatiles of the coated article is at least 3% by weight, preferably at least 4% by weight, more preferably at least 5% by weight and, most preferably at least 7% by weight.

The application of the resin composition to the carrier material can preferably be performed by at least partially immersing the carrier material in the resin composition. The application of the resin composition to the carrier material is in a preferred embodiment conducted by dipping of the carrier material into a bath comprising such resin composition. In another embodiment, the resin composition is dripped onto the carrier material. In another embodiment, the resin composition is sprayed on the carrier material.

The carrier material can be coated with the resin composition on one side or on both sides, preferably on both sides.

The resin composition favourably at least partly penetrates into the carrier material. Hence, the coated carrier material is preferably at least partly saturated with resin composition.

Optionally, the application of the resin composition can be repeated. Preferably, the application is repeated at least once. Therefore, the process for the production of the coated article is in one preferred aspect of the invention at least a two-step process.

If the process for the manufacture of the coated article of the invention is a two-step process the resin composition applied in the first coating step (hereinafter also "first resin composition") can be either the same or differ from the resin composition applied in the second step (hereinafter referred to also as "second resin composition").

It is preferred that the first and second resin compositions are different. Preferably they only differ in their additives. In a most preferred embodiment the first resin composition does contain no or at least less additives than the second resin composition. The first resin composition can be used to fill the core of the carrier material. The first composition preferably contains no or only a minor amount of additives. Additives are, however, typically required in the second resin composition, which covers the top part of the carrier material at least partially. The two-step coating process thus allows the reduction of additives in the first resin composition without losing quality due to the presence of additives in the second resin composition. In this approach the production costs can be reduced while maintaining high quality.

In a preferred embodiment, the carrier material thus is dipped into a bath comprising a first resin composition and, in a second step, into a second resin composition. The second application step can be conducted immediately after the first application step, i.e. without a drying step. This "wet-in-wet" mode of application is preferred. However, an intermediate drying step can be performed. This can be a drying at room temperature e.g. to a 15% solvent content. The drying can be performed e.g. with infrared or at elevated temperatures.

In another preferred aspect the invention provides a method for the manufacture of a coated article, in particular a shuttering board for a concrete shuttering, comprising the following steps of a) providing a carrier material, preferably paper,
b) applying a first resin composition to the carrier material,
c) applying a second resin composition to the carrier material,
d) optionally partially curing the first and second resin composition.

This process results in a coated article with a resin composition in the B-Stage.

This process, preferably, is a wet-in-wet process. The resulting coated article then can be applied to a wood board. After being attached to the wood board, e.g. by hot pressing, the resin composition of the coated article is fully cured.

In one embodiment of the invention the coated article is further coated, preferably only on one side, with a resin such as an adhesive resin. This adhesive coating can serve to attach the coated article to a wood board.

An "adhesive" in the sense of the invention means any sticky substance and relates to the molecular force that exists in the area of contact between two unlike bodies and that acts to persistently contact or unite them. Adhesives may contain a wide variety of component materials such as elastomers, resins, or tackifiers, fillers, plasticizers and softeners, antioxidants, curing agents, sequestering agents, biocides.

In a further aspect the invention relates to a coated article which is attached to a wood-product in order to provide a coated wood product, preferably a shuttering board for concrete shuttering.

According to the invention the term "wood product" generally refers to any product formed comprising wood based materials. Most preferred are wood based veneers and wood based panels. The wood based panel includes wood, plywood, chipboard, fibre board, oriented strand board (OSB), glue wood, laminated veneer lumber (LVL), parallel strand lumber (PSL), oriented strand lumber (OSL), 3-layer boards or the like.

The wood based panel, preferably, is selected from the group consisting of wood, plywood, chipboard, blockboard, fibre board, oriented strand board (OSB), glue wood, laminated veneer lumber (LVL), parallel strand lumber (PSL), oriented strand lumber (OSL), 3-layer boards, preferably plywood or blockboard, in particular spruce, birch or meranti plywood.

The coated wood product or wood based panel can be applied in the wood working industry, in particular in the manufacture of concrete shuttering.

The coated articles according to the invention are described with the following illustrative figures and examples, which should not be interpreted in order to limit the scope of protection.

EXAMPLES

Example 1: Preparation of Resin Compositions and Coated Articles According to the Invention and Comparison of their Free Formaldehyde Emission with a Coated Article Comprising a Phenolic Resin Composition 1.1 Objective The objective was to evaluate and compare the free formaldehyde emission of a coated article according to the invention comprising the resin composition A, with the emission of a coated article comprising a phenolic resin composition (composition B).

1.2 Test Setup

The resin compositions A and B were prepared and utilized to prepare a coated article.

Composition A is a resin composition comprising a mixture of melamine-formaldehyde, urea-formaldehyde and phenol-formaldehyde. Such a resin composition is described for example in US 2005/0136276.

The reference composition B is a standard phenolic resin known in the art with a phenol to formaldehyde proportion of 1:1.5.

Preparation of the Test Substrates:

Coated articles were prepared by impregnating paper or different weight (40 $g/m^2$, 60 $g/m^2$ or 80 $g/m^2$) with either resin composition A or B. The coating step was performed by dipping the paper into a bath.

The coated articles comprising either composition A or B were prepared by dipping the paper into a resin bath and consecutively dipping the wet paper in a second resin bath. The coated article according to the invention comprises composition A only and the reference coated article comprises a phenolic resin (composition B) only. After applying the resin compositions, the paper was dried.

Free Formaldehyde Emission Test:

The free formaldehyde emission test specification is based on VDA 275 and was conducted to determine the free formaldehyde emission of the respective films in relation to a blank feed comprising either resin composition A or B.

A PET bottle filled only with water was part of the measuring as a blank feed.

1.3 Results

The results of the formaldehyde free emission test are presented in table 1:

TABLE 1

Results of the free formaldehyde emission test

| coated article | Base paper [g/m$^2$] | Emission [mg/kg] |
|---|---|---|
| Composition A | 40 | 366 |
| | 60 | 495 |
| | 80 | 492 |
| Composition B | 40 | 1700 |
| | 60 | 1316 |
| | 80 | 1502 |

The test shows a lower free formaldehyde emission for the coated articles comprising composition A (invention) compared to the coated articles comprising composition B (reference).

Example 2: Testing of Surface Properties of the Coated Article According to the Invention 2.1 Objective The objective was to evaluate and compare three different types of coated articles, which were either coated with a resin composition A (invention) or the known phenolic resin (composition B; as above).

2.2 Test Setup

The following tests have been made to determine and show the surface properties of the coated articles of the invention.

The coated articles were prepared as described in example 1. In order to evaluate the surface properties of the wood-products resulting from the lamination of different wood bases with the coated article according to the invention, the coated articles were laminated onto a wood base by hot-pressing.

Further specification of the pressing conditions and the wood bases are listed in the sections below:

Crack Test:

To establish the risk of cracks of coated articles according to the invention, plywood was laminated under different test conditions, notched with a suitable template and dried under fixed test conditions.

Cracking (number of cracks, length of cracks) was evaluated after cooling.

Cobb Test:

The water permeability of article surfaces was determined by the absorbed water quantity through the surface (i.e. COBB values) of the test samples.

The coated article was pressed on both sides of a plywood and cut to a 12.5×12.5 cm square. After storage of the samples for three weeks in an air-conditioned room the COBB-values were determined as follows:

The initial weight of the samples was measured and documented and the sample was subsequently strained in the COBB apparatus. The cylinders of the apparatus were filled with deionized water. After 7 days the samples were dried, weighted and the final weight was documented. From the difference between the initial weight and the final weight the COBB value was calculated.

2.3 Results of Tests

Crack Test:

The results of the crack test are presented in table 2:

TABLE 2

Results of the crack test

| Wood material | resin | Paperweight [g/m$^2$] | Crack-index at presstime* 4 min | 6 min | 8 min |
|---|---|---|---|---|---|
| Birch | Composition A | 40 | 4 | 0 | 0 |
| | | 60 | 1 | 1 | 7,5 |
| | | 80 | 0 | 4 | 41,5 |
| | Composition B | 40 | 0 | 0 | 8 |
| | | 60 | 0 | 0 | 0 |
| | | 80 | 0 | 17 | 29 |
| Meranti | Composition A | 40 | 0 | 0 | 0 |
| | | 60 | 0 | 0 | 0 |
| | | 80 | 0 | 0 | 0 |
| | Composition B | 40 | 0 | 0 | 1,4 |
| | | 60 | 1,4 | 0 | 0 |
| | | 80 | 0 | 1,4 | 0 |
| | Composition B | 40 | 83,3 | 95,8 | 66,7 |

*under hot press conditions: 130° C. and 1,8 N/mm$^2$

As evident from table 2, the test results reveal that the coated article according to the invention (composition A) shows results comparable to a state-of-the-art phenolic resin composition (composition B). A satisfying crack-index can be obtained in all cases independent from the wood product, the pressing time or the weight of paper used during the test.

Cobb Test:

The results of the COBB test are depicted in table 4:

TABLE 4

Results of the COBB test

| Date | resin | Paperweight [g/m$^2$] | COBB value at presstime* 4 min | 6 min | 8 min |
|---|---|---|---|---|---|
| 24.01.2018 | Composition A | 40 | 96 | 99 | 77 |
| | | 60 | 63 | 43 | 78 |
| 25.01.2018 | Composition B | 40 | 488 | 352 | 235 |
| | | 60 | 332 | 226 | 165 |
| 01.02.2018 | Composition A | 40 | 139 | 130 | 73 |
| | | 60 | 79 | 62 | 80 |
| 01.02.2018 | Composition B | 40 | 481 | 241 | 165 |
| | | 60 | 126 | 123 | 78 |

*under hot press conditions: 130° C. and 1,8 N/mm$^2$

The evaluation of the COBB test results show clearly that the water permeability of the articles comprising composition A (invention) according to the invention give superior results compared to articles comprising composition B (reference).

Example 3—Testing of Residual Volatiles of the Coated Article According to the Invention Determination of Residual Volatiles 3.1 Objective The residual volatiles of a coated article are determined under fixed drying conditions. The underlying test method can be elaborated following DIN EN ISO 287.

3.2 Test Setup

The coated article is cut to 20×25 cm. After the preparation of the sample the weight is determined immediately with a precision scale (max. 0.05% tolerance). The initial weight is documented.

The prepared test sample is placed in a ventilated drying oven at 170±2° C. for 2 minutes. After cooling to room temperature, its dry weight is determined.

3.3 Evaluation

The volatile content is determined with the following formula:

Volatile content(%)=(initial weight−end weight)×100/initial weight.

The average value is determined and documented as the residual volatile content.

Example 4—Testing of the Flow of the Resin Compositions in the Coated Article of the Invention Flow Test 4.1 Objective For quantification of the flow after drying the coated article is subjected to pressure at a predetermined temperature in a flow press for a predetermined pressing time.

4.2 Test Setup

The coated article is cut to 10×10 cm to result in a cubic test sample. After the preparation of the sample its initial weight is determined. The prepared test sample is placed consecutively between two press plates (15×15 cm) at room temperature (25° C.) in a standard flow press. The test sample is pressed at 2.0 N/mm$^2$ and 160° C. for two minutes and the resulting weight (end weight) is determined after the pressing.

4.3 Evaluation

The flow can be measured by detecting the percentage change in weight before and after the pressing and is calculated as follows:

Flow %=(initial weight−end weight)×100/initial weight

PREFERRED EMBODIMENTS

Embodiment 1

A coated article comprising:
a) a carrier material, preferably paper, and
b) a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof,
wherein the resin composition is a B-stage resin composition.

Embodiment 2

A coated article comprising:
a) a carrier material, preferably paper, and
b) a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof,
wherein the resin composition is characterized by a degree of crosslinking which is less than 100%, preferably less than 95%, more preferably less than 90%, most preferably less than 80%.

Embodiment 3

A coated article comprising:
a) a carrier material, preferably paper, and
b) a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof,
wherein the resin composition is characterized by a total content of residual volatiles of at least 3% by weight, preferably at least 4% by weight and, more preferably 5% by weight, most preferably, at least 7% by weight.

Embodiment 4

The coated article according to embodiment 1 or 2, wherein the resin composition is characterized by a total content of residual volatiles of at least 3% by weight, preferably at least 4% by weight and, more preferably 5% by weight, most preferably, at least 7% by weight.

Embodiment 5

The coated article according to embodiment 1 or 3, wherein the resin composition is characterized by a degree of crosslinking which is less than 100%, preferably less than 95%, more preferably less than 90%, most preferably less than 80%.

Embodiment 6

The coated article according to any one of the preceding embodiments, wherein the total content of residual volatiles of the coating article is lower than 20% by weight, preferably lower than 15% by weight, more preferably lower than 10% by weight, most preferably the total content of residual volatiles is between 3 and 15% by weight, in particular between 3 and 10% by weight.

Embodiment 7

The coated article according to any one of the preceding embodiments, wherein the resin composition has a has a flow of at least 1%, preferably of at least 2%, of at least 3% or, most preferably of at least 5% when being pressed for 2 min at 160° C. under 2.0 N/mm$^2$.

Embodiment 8

The coated article according to any one of the preceding embodiments, wherein the article comprises more than 50% by weight of resin, preferably at least 55% by weight of resin, most preferably at least 60% by weight of resin based on the weight of the dried coated article.

Embodiment 9

The coated article according to any one of the preceding embodiments, wherein the resin composition is obtainable by matching at least the following components:
a) a melamine, a urea, a phenol and formaldehyde; or b) a melamine-formaldehyde (MF)-resin, a urea-formaldehyde (UF)-resin and a phenol-formaldehyde (PF)-resin.

Embodiment 10

The coated article according to any one of the preceding embodiments, wherein the article exhibits a 7 day COBB value of 300 g/m$^2$ or less, preferably of 250 g/m$^2$ or less, more preferably of 200 g/m$^2$ or less.

Embodiment 11

The coated article according to any one of the preceding embodiments, wherein the resin composition has a molar ratio of phenol to total formaldehyde in the range of at least 1 to 5, preferably of at least 1 to 8, more preferably of at least 1 to 10, most preferably of at least 1 to 13.

Embodiment 12

The coated article according to any one of the preceding embodiments, wherein the resin composition has a molar ratio of melamine to total formaldehyde in the range of at least 1 to 1, preferably of at least 1 to 2, most preferably of at least 1 to 3.

Embodiment 13

The coated article according to any one of the preceding embodiments, wherein the resin composition has a molar ratio of urea to total formaldehyde in the range of at least 1 to 1, preferably of at least 1 to 2, more preferably of at least 1 to 3, most preferably of at least 1 to 4.

Embodiment 14

The coated article according to any one of the preceding embodiments, wherein less than 40% by weight, more preferably less than 35% by weight, further preferably less than 30% by weight and most preferably less than 20% by weight of the coating layer composition penetrates into the material to be coated.

Embodiment 15

The coated article according to any one of the preceding embodiments, wherein the carrier material comprises a further resin composition and the resin composition of claim 1b) is not equal to the further resin composition.

Embodiment 16

The coated article according to any one of the preceding embodiments, wherein the article's overall weight is in the range of at least 80 to 300 g/m$^2$, preferably of at least 100 to 270 g/m$^2$, more preferably of at least 115 to 240 g/m$^2$, most preferably 120 to 220 g/m$^2$.

Embodiment 17

The coated article according to any one of the preceding embodiments, wherein the resin composition comprises a further condensation partner of the group consisting of glycol, diamide, sulphonamide, thiourea, lactame, saccharide, guanamine, preferably caprolactame, acetoguanamine, benzoguanamine, dicyandiamide or p-toluene-sulphonamide.

Embodiment 18

The coated article according to any one of the preceding embodiments, wherein the resin composition comprises a base, preferably a metal hydroxide, more preferably an alkali hydroxide, most preferably sodium hydroxide or potassium hydroxide.

Embodiment 19

The coated article according to any one of the preceding embodiments, wherein the carrier material is having a weight per square meter of 20 to 100 g/m$^2$, preferably 30 to 90 g/m$^2$, most preferably 40 to 80 g/m$^2$.

Embodiment 20

The coated article according to any one of the preceding embodiments, wherein the article is further coated with a resin such as an adhesive resin.

Embodiment 21

A wood-product obtainable by a coated article according to any one of the preceding embodiments 1 to 20.

Embodiment 22

Wood-product according to embodiment 21, wherein the wood-product is selected from a group consisting of a wood-based panel or a wood-based veneer, more preferably a wood-based panel.

Embodiment 23

Wood product according to any one of the preceding embodiments 21 or 22, wherein the wood-based panel is selected from a group consisting of wood, plywood, chipboard, blockboard, fibre board, oriented strand board (OSB), glue wood, laminated veneer lumber (LVL), parallel strand lumber (PSL), oriented strand lumber (OSL), 3-layer boards, preferably plywood or blockboard, in particular spruce, birch or meranti plywood.

Embodiment 24

Method of manufacturing a coated article, in particular a shuttering board for concrete shuttering, comprising the following steps a) providing a carrier material,
b) applying a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof to the carrier material.
c) optionally curing the resin composition therewith resulting in a B-stage resin composition.

Embodiment 25

Method of manufacturing a coated article, in particular a shuttering board for concrete shuttering, comprising the following steps a) providing a carrier material, b) applying a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof to the carrier material.

c) optionally curing the resin composition therewith resulting in a resin composition, wherein the degree of crosslinking is less than 100%, preferably less than 95%, more preferably less than 90%, most preferably less than 80%.

Embodiment 26

Method of manufacturing a coated article, in particular a shuttering board for concrete shuttering, comprising the following steps a) providing a carrier material, b) applying a resin composition comprising a melamine-urea-phenol-formaldehyde-co-condensate, a mixture of a melamine-formaldehyde (MF)-resin, a urea-formaldehyde (UF)-resin and a phenol-formaldehyde (PF)-resin, or a mixture thereof to the carrier material.

c) optionally curing the resin composition therewith resulting in a resin composition, wherein the total content of residual volatiles of the coated article is at least 3% by weight, preferably at least 4% by weight, more preferably at least 5% by weight and, most preferably at least 7% by weight.

Embodiment 27

Method of manufacturing a coated article according to any of the preceding embodiments 24 to 26,
comprising the following steps a) providing a paper, b) applying a first resin composition to the paper, c) applying a second resin composition to the paper according to the invention described herein, d) optionally curing the first and second resin composition therewith resulting in a B-stage of the first and second resin composition.

Embodiment 28

The method of manufacturing according to any of the preceding embodiments 24, 25 or 27, wherein the total content of residual volatiles in the coated article is at least 3% by weight, preferably at least 5% by weight and, most preferably, at least 7% by weight.

Embodiment 29

Use of a coated article according to any of the preceding embodiments 1 to 20, for preparing the wood-product according to any of the preceding embodiments 21 to 23.

Embodiment 30

Use of a coated article according to any of the preceding embodiments 1 to 20, for preparing a shuttering board for concrete shuttering.

VERY PREFERRED EMBODIMENTS

1. A coated article comprising a) a carrier material, preferably paper, and b) a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, wherein the resin composition has a molar ratio of phenol to total formaldehyde in the range of at least 1 to 5, preferably of at least 1 to 8, more preferably of at least 1 to 10, most preferably of at least 1 to 13, a molar ratio of melamine to total formaldehyde in the range of at least 1 to 1, preferably of at least 1 to 2, most preferably of at least 1 to 3 and a molar ratio of urea to total formaldehyde in the range of at least 1 to 1, preferably of at least 1 to 2, more preferably of at least 1 to 3, most preferably of at least 1 to 4.

2. The coated article according to embodiment 1, wherein the resin composition is a B-stage resin composition.

3. The coated article according to embodiment 1 or 2, wherein the resin composition has a molar ratio of phenol to total formaldehyde in the range up to a maximum of 1 to 30, preferably up to a maximum of 1 to 25, most preferably up to a maximum of 1 to 20, a molar ratio of melamine to total formaldehyde in the range up to a maximum of 1 to 20, preferably up to a maximum of 1 to 15, most preferably up to a maximum of 1 to 10 and a molar ratio of urea to total formaldehyde in the range up to a maximum of 1 to 20, preferably up to a maximum of 1 to 15, most preferably up to a maximum of 1 to 10.

4. The coated article according to any one of the preceding embodiments, wherein the resin composition is characterized by a degree of crosslinking which is less than 100%, preferably less than 95%, more preferably less than 90%, most preferably less than 80

5. The coated article according to any one of the preceding embodiments, wherein the resin composition is characterized by a total content of residual volatiles of at least 3% by weight, preferably of at least 4% by weight, more preferably of at least 5% by weight and, most preferably, of at least 7% by weight.

6. The coated article according to any one of the preceding embodiments, wherein the article comprises more than 50% by weight of resin, preferably at least 55% by weight of resin, most preferably at least 60% by weight of resin based on the weight of the dried coated article.

7. The coated article according to any one of the preceding embodiments, wherein the resin composition is obtainable by matching at least the following components:

a) a melamine, a urea, a phenol and formaldehyde;
or b) an MF-resin, a UF-resin and a PF-resin.

8. The coated article according to any one of the preceding embodiments, wherein the article exhibits a 7 day COBB value of 300 $g/m^2$ or less, preferably of 250 $g/m^2$ or less, more preferably of 200 $g/m^2$ or less.

9. The coated article according to any one of the preceding embodiments, wherein the carrier material comprises a further resin composition and the resin composition of embodiment 1b), embodiment 2 or embodiment 3 is not equal to the further resin composition.

10. The coated article according to any one of the preceding embodiments, wherein the resin composition comprises a base, preferably a metal hydroxide, more preferably an alkali hydroxide, most preferably sodium hydroxide or potassium hydroxide.
11. A wood product, in particular a shuttering board, obtainable by applying the coated article according to any one of embodiments 1 to 10 to a wood board.
12. Method of manufacturing a coated article, in particular a shuttering board for concrete shuttering, comprising the following steps
    a) providing a carrier material, preferably paper,
    b) applying a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, to the carrier material,
    c) curing the resin composition therewith resulting in a resin composition, wherein the degree of crosslinking is less than 100%, preferably less than 95%, more preferably less than 90%, most preferably less than 80%.
13. Method of manufacturing a coated article, in particular a shuttering board for concrete shuttering, comprising the following steps
    a) providing a paper,
    b) applying a first resin composition to the paper,
    c) applying a second resin composition to the paper, wherein the first resin composition differs from the second resin composition
    d) curing the first and second resin composition therewith resulting in B-staged resin compositions.
14. Method of manufacturing a coated article, in particular a shuttering board for concrete shuttering, comprising the following steps
    a) providing a paper,
    b) applying a first resin composition to the paper,
    c) applying a second resin composition to the paper, wherein the first resin composition differs from the second resin composition
    d) curing the first and second resin composition therewith resulting in resin compositions, wherein the degree of crosslinking is less than 100%, preferably less than 95%, more preferably less than 90%, most preferably less than 80%.
15. Use of a coated article according to any of the preceding embodiments 1 to 10, for preparing a wood product.
16. The wood product, in particular the shuttering board, according to embodiment 11, wherein the coated article is applied to the wood board by hot pressing.
17. A shuttering board obtainable by applying a coated article comprising a carrier material, preferably paper, and a resin composition comprising a melamine-urea-phenol-formaldehyde-co-condensate or a mixture of a melamine-formaldehyde (MF)-resin, a urea-formaldehyde (UF)-resin and a phenol-formaldehyde (PF)-resin, or a mixture of the co-condensate and the mixture of the MF-resin, the UF-resin and the PF-resin, to a wood board.
18. A shuttering board comprising wood, preferably spruce, birch and/or meranti wood and a coated carrier material, preferably paper comprising at least one resin composition containing phenol, melamine, urea, formaldehyde and optionally additives.
19. A shuttering board comprising wood, preferably spruce, birch and/or meranti wood and a coated carrier material, preferably paper comprising at least two differing resin compositions each containing phenol, melamine, urea, formaldehyde and optionally additives.
20. The shuttering board according to embodiment 18 or 19, wherein the at least one resin composition has
    a molar ratio of phenol to total formaldehyde in the range of at least 1 to 5, preferably of at least 1 to 8, more preferably of at least 1 to 10, most preferably of at least 1 to 13,
    a molar ratio of melamine to total formaldehyde in the range of at least 1 to 1, preferably of at least 1 to 2, most preferably of at least 1 to 3 and
    a molar ratio of urea to total formaldehyde in the range of at least 1 to 1, preferably of at least 1 to 2, more preferably of at least 1 to 3, most preferably of at least 1 to 4.
21. The shuttering board according to embodiment 18, 19 or 20, wherein the at least one resin composition has
    a molar ratio of phenol to total formaldehyde in the range up to a maximum of 1 to 30, preferably up to a maximum of 1 to 25, most preferably up to a maximum of 1 to 20,
    a molar ratio of melamine to total formaldehyde in the range up to a maximum of 1 to 20, preferably up to a maximum of 1 to 15, most preferably up to a maximum of 1 to 10 and
    a molar ratio of urea to total formaldehyde in the range up to a maximum of 1 to 20, preferably up to a maximum of 1 to 15, most preferably up to a maximum of 1 to 10.
22. The shuttering board according to any one of embodiments 18 to 21, wherein the at least one resin composition has
    a molar ratio of phenol to total formaldehyde in the range from 1:10 up to 1:15,
    a molar ratio of melamine to total formaldehyde in the range from 1:4 up to 1:8 and
    a molar ratio of urea to total formaldehyde in the range from 1:3 up to 1:8.
23. The shuttering board according to any one of embodiments 18 to 22 for concrete shuttering.

The invention claimed is:

1. A coated article comprising a) a carrier material and b) a resin composition comprising (i) a mixture of a melamine-formaldehyde (MF)-resin, a urea-formaldehyde (UF)-resin and a phenol-formaldehyde (PF)-resin, or (ii) a mixture of (1) a melamine-urea-phenol-formaldehyde-co-condensate and (2) the mixture of the MF-resin, the UF-resin and the PF-resin, wherein the resin composition has a molar ratio of phenol to total formaldehyde in the range from 1:13 up to 1:20, a molar ratio of melamine to total formaldehyde in the range of at least 1:3 up to 1:10, and a molar ratio of urea to total formaldehyde in the range of at least 1:4 up to 1:10.

2. The coated article according to claim 1, wherein the carrier material is a paper.

3. The coated article according to claim 1, wherein the resin composition is a B-stage resin characterized by a degree of crosslinking which is less than 100%.

4. The coated article according to claim 1, wherein the resin composition is characterized by a total content of residual volatiles of at least 3% by weight.

5. The coated article according to claim 1, wherein the article comprises more than 50% by weight of resin based on the weight of the dried coated article.

6. The coated article according to claim 1, wherein the article exhibits a 7 day COBB value of 300 $g/m^2$ or less.

7. The coated article according to claim 1, wherein the resin composition is a first resin composition, and the carrier material comprises a second resin composition, which differs from the first resin composition.

8. The coated article according to claim 1, wherein the resin composition comprises the mixture of a melamine-formaldehyde (MF)-resin, a urea-formaldehyde (UF)-resin and a phenol-formaldehyde (PF)-resin.

9. The coated article according to claim 1, wherein the resin composition comprises the mixture of (1) the co-condensate and (2) the mixture of a melamine-formaldehyde (MF)-resin, a urea-formaldehyde (UF)-resin and a phenol-formaldehyde (PF)-resin.

* * * * *